(12) United States Patent
Dillman et al.

(10) Patent No.: US 7,546,575 B1
(45) Date of Patent: Jun. 9, 2009

(54) SYSTEM AND METHOD FOR USING BLUEPRINTS TO PROVIDE A SOFTWARE SOLUTION FOR AN ENTERPRISE

(76) Inventors: Frederick J. Dillman, 24 Locust Way, Lafayette Hill, PA (US) 19444; Edward S. Ferrara, 436 N. High St., West Chester, PA (US) 19380; Sumeet Malhotra, 3855 Blair Mill Rd., Suite 222J, Horsham, PA (US) 19044

( * ) Notice: Subject to any disclaimer, the term of this patent is extended or adjusted under 35 U.S.C. 154(b) by 366 days.

(21) Appl. No.: 10/457,250

(22) Filed: Jun. 9, 2003

(51) Int. Cl.
*G06F 9/44* (2006.01)
*G06F 9/45* (2006.01)

(52) U.S. Cl. .................. 717/102; 717/106; 717/108; 717/123

(58) Field of Classification Search .......... 717/100–123
See application file for complete search history.

(56) References Cited

U.S. PATENT DOCUMENTS

2002/0091990 A1* 7/2002 Little et al. ............... 717/105
2003/0126151 A1* 7/2003 Jung ......................... 707/100
2004/0054985 A1* 3/2004 Sewell ...................... 717/109
2004/0117759 A1* 6/2004 Rippert et al. ............ 717/100

* cited by examiner

*Primary Examiner*—Chuck O Kendall
(74) *Attorney, Agent, or Firm*—Richard J. Gregson; Woodcock Washburn

(57) ABSTRACT

The present invention provides a technique for the development of a software-based business solution using blueprint. A blueprint is a collection of artifacts that relate to an enterprise, and to the processes that an enterprise may perform. The blueprint may contain artifacts describing general business goals for a particular type of enterprise (e.g., a transportation company), as well as descriptions of processes typically performed by such an enterprise. The blueprint may be customized to fit a particular enterprise, and may be used as a basis to select and/or create software component, combine components into software applications, and deploy the applications on an infrastructure.

16 Claims, 6 Drawing Sheets

SYSTEM AND METHOD FOR USING BLUEPRINTS TO PROVIDE A SOFTWARE SOLUTION FOR AN ENTERPRISE

FIELD OF THE INVENTION

The present invention relates generally to the field of software development. More particularly, the invention provides a technique for using blueprint to provide a software solution for an enterprise.

BACKGROUND OF THE INVENTION

Many enterprises use software to perform various tasks in furtherance of the business of the enterprise. For example, an airline may use such software to receive reservation requests from customers and travel agents. In addition, the airline may use business software to track planes, schedule flight crews, arrange for in-flight meals, order fuel and monitor parts inventory.

Traditionally, software employed by an enterprise is customized to one degree or another. For example, software (e.g., an airline reservation system) may be custom-built from the ground up. Alternatively, the software may begin as an off-the-shelf product, and then undergo some level of modification. In some cases, software that was custom-built has undergone modifications and updates to bring it in line with current requirements.

Customized software is associated with at least two problems. First, customization is labor-intensive, and thus any customization of software is expensive. Second, customizations are often poorly documented, thus making it difficult to maintain the software, or make further customizations to it. Often, attempts to modify customized software produce unintended results, which is partly due to the fact that there is no structured way to connect the implementation of the software with the original goals that the software was intended to accomplish.

Business software, and the hardware needed to implement it, of older existing business software systems are commonly referred to as "legacy" systems. Legacy systems are typically examples of custom software that is difficult to modify. Even legacy systems that were not custom-built share many of the problems of custom software, because they may be poorly documented. A legacy system is an existing system within a company that continues to be used despite being out-of-date, incompatible with current systems, or otherwise undesirable. Generally, legacy systems tend to be difficult and expensive to modify and unnecessarily large. Thus, legacy systems typically continue to be used despite such shortcomings because the cost of replacing or redesigning the system may be prohibitive. As a result, the company is forced to trade-off a certain level of competitiveness relative to its more modern competitors because of the expense of replacing a legacy system.

Legacy systems are often difficult and expensive to update. In many applications, the software for such systems is written in old computer languages and may have been custom-made for the company. As a result, any attempts to further update the software may require the company to obtain assistance from the original vendor, who may have institutional knowledge of the company's software. However, in some cases the original vendor may be very expensive, unavailable or even out of business. Alternatively, the company may have another vendor update the software, which will invariably require in-depth analysis of the software before a programmer can become familiar enough with the software to implement an update. The additional effort required to perform an update to a legacy system also increases the monetary costs associated with the update. In addition, the software may be proprietary, so the company is forced to deal with a vendor who effectively has a monopoly over the software and who can therefore charge higher prices.

Legacy systems, as well as newer conventional business software systems, often lack adequate documentation to enable a programmer to understand the system and to determine which other systems, if any, might be affected by a change. For example, software in one part of a system may have been written specifically to run on a certain type of computer. Without sufficient documentation, a programmer intending to run the software on a different type of computer may have great difficulty determining which parts of the software code were computer-specific. Therefore, the added time required for the programmer to determine which parts of the software need to be changed adds to the costs involved with the change. The programmer may also be unaware that a change to the software in one system may have an effect on another system. For example, another system that is either within or outside the company may communicate with the software that is running on the original computer by using a computer-specific software protocol. By changing the computer and its associated software, the other system may no longer be able to communicate with the software. Thus, the programmer may not know that a problem exists until the change is implemented and the systems can no longer communicate, which again adversely affects the costs of the software change.

Current attempts to create a method for upgrading and replacing legacy systems are still too cumbersome and expensive. For example, a conventional process for upgrading an enterprise's system typically customizes the upgrade process from the ground up. As a result, an upgrade is a time- and money-consuming process that requires a large upgrade budget that may be out of reach for many companies. Other systems may not be customizable at all, or at most only a minor amount of customization may occur, thereby locking a company into using a system that may not be a perfect match for its business.

In addition to the typical shortcomings of legacy systems, there also shortcomings in the conventional methods for automating business processes in business software. Fundamentally, any software application—such as an application that is used as a business software system—is a set of instructions that can be followed by a computer to perform one or more tasks. Traditionally, a software application was designed by identifying the task(s) to be performed and writing instructions to perform those tasks in a programming language, such as C or C++. The disadvantage to this traditional approach is that it requires the software developer to model the development process in terms of the low-level actions that a computer can be instructed to perform, rather than in terms of the contemplated use of the software by actual business users. For example, if the software to be developed is an organization-wide scheduling system for a company, the traditional approach to software development may require the developer to model the problem in terms of how calendars are represented as data structures and manipulated arithmetically, how users are uniquely identified within the system, etc. This type of model for the software is at a much "lower-level" than the business problem that the software is intended to solve.

Software development tools, such as the RATIONAL ROSE visual modeling tool from Rational Software Corporation, seek to improve on the traditional software development process by allowing the function of the software to be modeled at a relatively higher level of abstraction. With RATIONAL ROSE, instead of modeling the requirements for software in terms of the basic actions to be performed by a computer, a software developer can abstract the software under development in terms of "use cases" and object models. A "use case" is an instance of the use of the software by an actor. For example, in the scheduling system mentioned above, a use case might be a calendar owner's scheduling of a personal appointment on his or her calendar. Having identified one or more such use cases, the software developer can build the software by separately modeling and then coding each of the use cases.

Use cases are a useful abstraction because they allow the software developer to create software with a view toward specific situations that the software will be expected to handle. However, use cases still have the drawback of being, in many situations, at a much lower level of abstraction than the requirements for which the software is designed. Software is generally envisioned to meet the requirements of a business model, and a business model is usually conceived as a high-level plan to implement a business process, rather than as a collection of specific examples of how the software will be used. For example, the management of a company (which, in many cases, is composed of a group of non-programmers) may envision a scheduling system that meets certain requirements and solves certain scheduling problems. However, the management's vision for such a system is not likely to be at a level of detail that includes all of the exemplary uses of the system (e.g., scheduling a personal appointment, scheduling a university-wide event, canceling an appointment, deleting from the system a user who has left the university, etc.).

In addition, management's vision will most likely not indicate where all of the interrelationships between such a system and any other system in the company may lie. Also, documenting each of the systems and processes in a company that are to be implemented in software code and the systems' and processes' interrelationships can be an extremely time consuming process that is prone to error.

Accordingly, what is needed is a technique for creating a solution to business software that allows the software to be designed based on the business vision that the software is intended to implement, takes advantage of reusable software designs and components, and allows the software (as well as any customizations and future changes) to be documented. Such a technique would allow software to be developed at a lower cost, would allow for a close correspondence between the software and the business vision that the software is designed to implement, and would also simply future upgrades or modifications to the software by systematically documenting the relationship between the software itself the software's design, and the business model that the software is designed to implement. No such system has been realized in the prior art.

SUMMARY OF THE INVENTION

The present invention provides a method and system for developing a software-based solution for an enterprise. A blueprint comprising a set of one or more artifacts is provided. The artifacts document one or more aspects relating to business processes and/or to the design, implementation, or deployment of software relating to those business processes. Blueprints containing artifacts that are preconfigured for a particular industry are also provided. Artifacts and blueprints may be interchangeable and customizable, thereby enabling the blueprint to be used for a wide variety of enterprises and business processes.

In order to provide a software solution for an enterprise, a blueprint relating to the field in which the enterprise operates is selected. For example, if the enterprise is an airline, then a blueprint for transportation software can be selected. The blueprint contains artifacts relating to aspects of a transportation business such as: a business vision, a description of typical operations for a transportation business, a glossary of terms typically used in a transportation business, use cases for software that has been designed for a typical transportation business, and so forth. Once the blueprint has been selected, it may be customized to fit the particular needs of a given enterprise (e.g., airline A may have a somewhat different business vision from, or may perform different types of operations from, airline B, and thus the transportation enterprise blueprint can be customized for either airline).

After the blueprint has been selected and customized, at least some of the enterprise's business processes are selected for automation using a business software solution. Any documentation contained in the artifacts that relates to processes not being automated may still be retained as a reference, or for use in guiding future software development for the enterprise. The artifacts that relate to business processes that are being automated are used as a guide for a programmer to create a business software solution. Functional components, such as prefabricated software modules are used when possible to automate business processes. Alternatively, customized software code may also be used. The prefabricated modules and/or customized software code is then combined into a business software solution. The business software solution is then implemented using a hardware infrastructure using any type of hardware that is appropriate to the automated business process.

Preferably, the artifacts reference each other in order to provide traceability in terms of design decisions. For example, a use case may be created to model a certain process that the enterprise performs. Thus, an artifact relating to the use case and an artifact relating to the business process that the use case is designed to model preferably reference each other. Thus, if the business process changes, the artifacts will memorialize the fact that the use case (as well as any underlying software that implements the use case) may need to be changed as well. Thus, a change to a business process may be propagated throughout the business software solution by following the references that are included in the artifact documenting the changed business process. Upon locating all the affected artifacts and making the appropriate changes, a revised business software solution may be created by changing the functional components and software code that corresponds to the changed artifacts.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

DETAILED DESCRIPTION OF ILLUSTRATIVE EMBODIMENTS

When the software industry was in its infancy, software was typically envisioned, designed, and written by programmers. In general, programmers would attempt to understand a problem that existed in the business world, and would then write software to solve the problem as they perceived it. As the software development industry has matured, the process of software development has shifted from a focus on what problems software developers are able to solve to a focus on the processes that business people need to automate. The present invention provides a methodology for developing a comprehensive and robust business software solution. The invention leverages the common ground in what different enterprises seek in a software solution by starting with a basic blueprint of the solution. The invention further allows any modifications to the basic blueprint in terms of customizations, development specifics, or deployment details, to be documented in a way that allows the effect of a modification to be seen at all levels of development. For example, the relationship between a business process and its implementation in software is documented in a systematic way, so at a later date this relationship can be seen, which may motivate the way that future changes to the software or the business processes are addressed. This methodology helps to maintain accountability of the effect a change to one part of the solution will have on any other part.

It should be understood that the methodology disclosed below can be implemented with the aid of software development tools that execute on a computing device. Such software development tools may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 1:
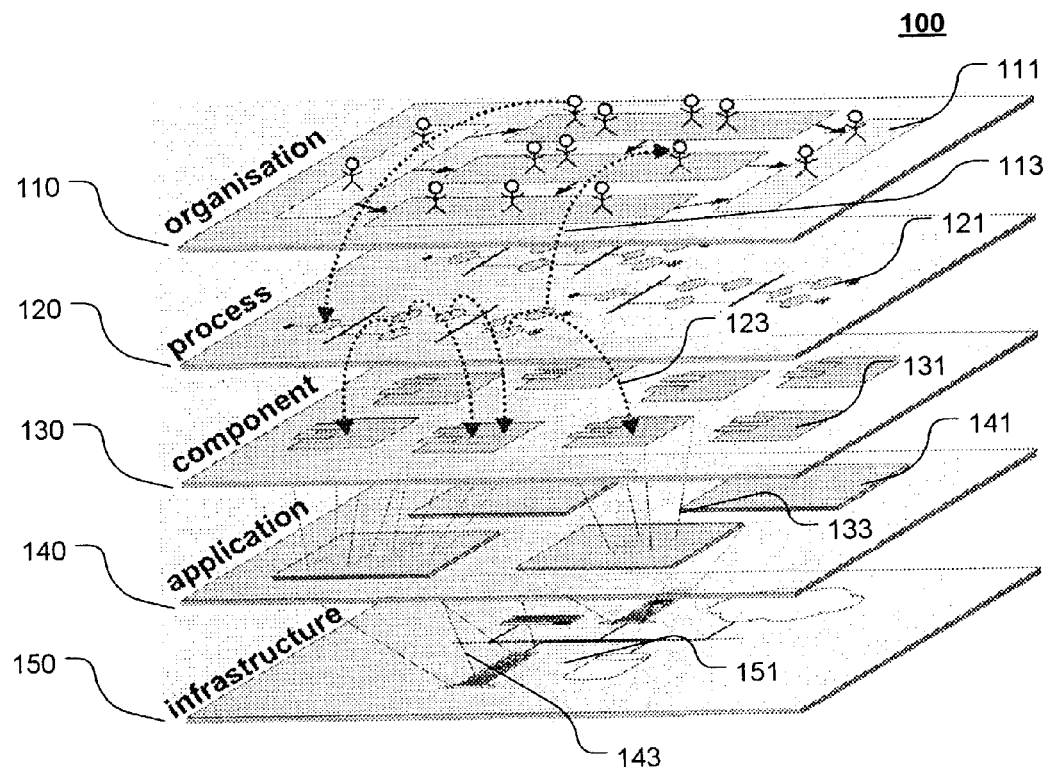
FIG. 1 is a functional diagram showing an overview of a system for creating a business software solution for a company.

FIG. 1 is a functional diagram showing an overview of an enterprise 100, and the various levels at which enterprise 100 can be modeled. As may be appreciated, a enterprise as disclosed herein may be any type of business organization that is engaged in any line or lines of business. The complexity of the business process or processes to be automated may range from very simple to highly complex. While a more complex enterprise may require a more complex business software solution, the structure of enterprise 100 is similar regardless of the complexity of the business in which it is engaged. As can be seen in FIG. 1, enterprise 100 can be modeled or defined by a series of levels 110, 120, 130, 140 and 150. At the organization level 110, the organization 111 of an enterprise is defined. The organization represents such features as how the organization is divided into departments, how the management of the organization is structured, etc. Such a definition can be created in any number of ways, such as by interviewing company personnel, reviewing company organizational references and the like. As may be appreciated, an enterprise—and events that take place within an enterprise—may also be defined in any number of ways. For example, an enterprise may be defined in terms of each employee's job function. Thus, an organization 111 of an enterprise may be defined in terms of each employee's relationship to other employees. For example, organization 111 may reflect that an airline has a luggage department and a ticketing department, and that the heads of these departments both report to a chief of operations.

Another level at which an enterprise may be modeled is the process level 120. Essentially, the relationship between the organization level 110 and the process level 120 is that the level 120 represents the various processes that the organizations in level 110 carry out. It should be appreciated that level 110 and level 120 convey different types of information. That is, an organization can be described without reference to what it does, and processes can be described without reference to who will perform them. However, it will also be appreciated that there may be a mapping between structures shown at organization level 110 and process level 120—that is, certain organizations may participate in certain processes, but not in others. For reasons described below, it may be useful to understand this mapping in order to provide some level of traceability in documenting a software solution.

Returning to a description of the process level, level 120 shows the various processes that take place in an enterprise. The company organization 111 determined at the organization level 110 is mapped 113 into a process definition 121. An exemplary process definition may be, for example, a process used by an airline to receive a reservation over the Internet. Another type of process may be a process of receiving luggage at a check in counter and transporting it to the appropriate plane. As may be appreciated, an entire company may be viewed in terms of the processes that take place therein. Some of the processes, such as for example the receipt of a reservation over the Internet, may benefit from a high degree of automation by business software. Other processes, such as moving luggage from the check-in counter to the airplane, cannot easily be automated by business software (although certain incidental parts of the process can be automated with software, such as using bar-coded tags to track the location of individual suitcases). Still other processes may be capable of being automated, but for business or economic reasons the company may desire to continue performing such processes manually. Thus, of the processes that are capable of being automated, a decision should be made as to which processes will be automated by way of business software. In one embodiment, only the processes that are selected for automation will proceed to levels 130, 140 and 150.

Component level 130 shows the various components that will ultimately be used to built a software solution for the enterprise. The processes selected for automation are mapped 123 into software components 131 at the component level 130. As may be appreciated, software components 131 may be reused for similar processes and therefore need not be created every time a business software solution is desired. Therefore, a library of business software-specific components 131 may be maintained, and an appropriate component 131 may be selected when needed. Alternatively, if a software component 131 is not available for a particular process definition 121, then an appropriate component 131 may be created.

Application level 140 shows the applications 141 into which components 131 may be incorporated. Software components 131 may be incorporated 133 into software applications 141. As was the case with software components 131, above, software applications 141 may be already available in a library (not shown) or may be created specifically for the company. As may be appreciated, any combination of pre-fabricated and specially-made components 131 and applications 141 may embody a business software solution.

In one embodiment, the business software solution is enabled 143 by way of a computer infrastructure 151 at the infrastructure level 150. Computer infrastructure 151 may be any type of computing equipment that is capable of implementing the business software solution applications 141 as created at the application level 140. As may be appreciated, the computer infrastructure 151 may be any type of computing device that is appropriate to the application 151 being implemented. For example, an airline reservation application may be implemented using a networked computer system that is capable of accepting reservation requests from travelers. Such a reservation system may have communications electronics, such as electronics to enable telephone and computer connections, and may also have a database and computer hardware capable of handling the large number of computations necessary to handle reservations. Alternatively, computer infrastructure 151 may be handheld electronics or the like for other types of applications 141.

Figure 2:
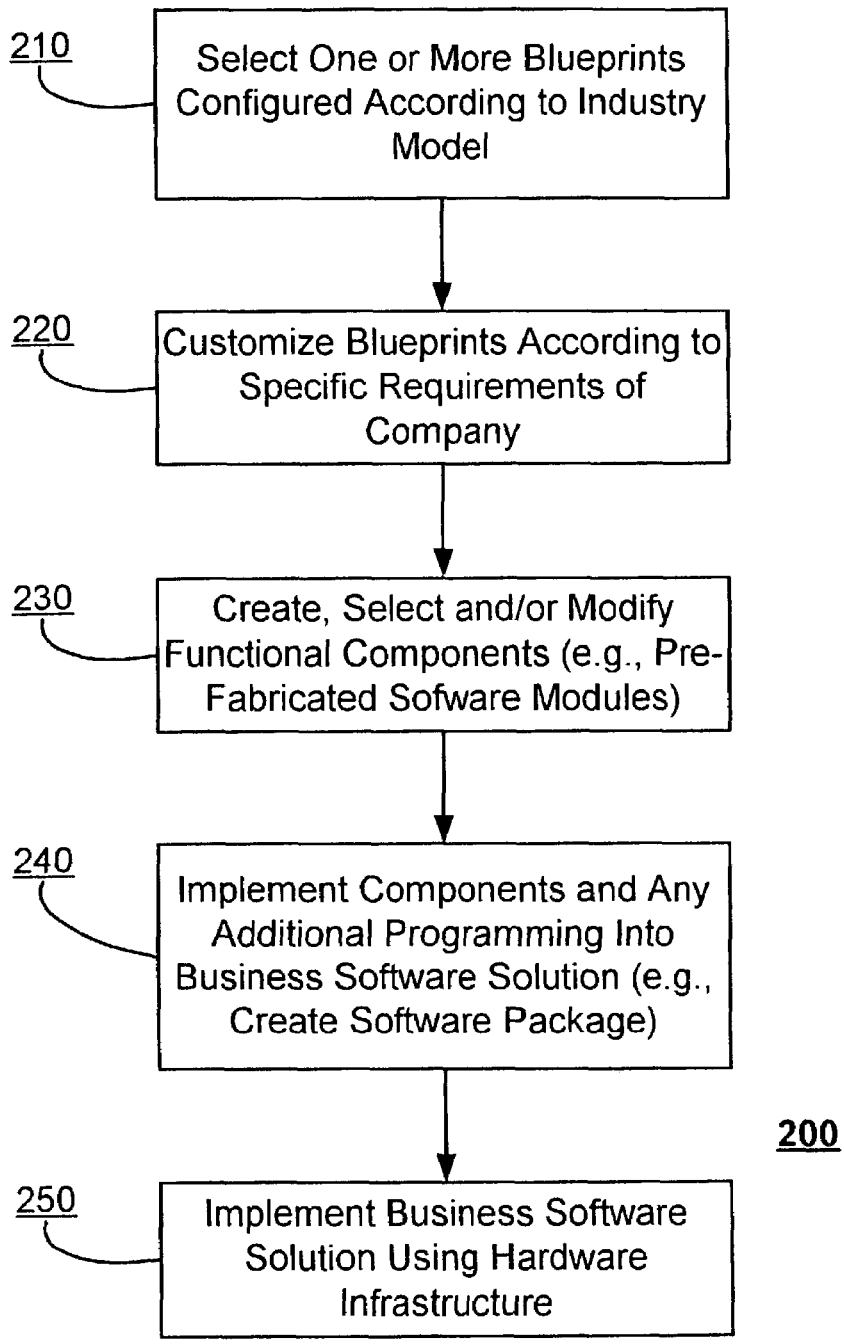
FIG. 2 is a flowchart of an exemplary method of generating a business software solution for a company according to an embodiment of the present invention.

Turning now to FIG. 2, an overview of a method 200 of generating a business software solution for an enterprise according to an embodiment is disclosed. As noted above in connection with FIG. 1, an embodiment uses one or more blueprints to define the business process of an enterprise. A blueprint is a collection of documents, called artifacts, that can be used to create a cross-referenced representation of the business processes that occur within an enterprise. For example, an artifact may take the form of a word processing document, a spreadsheet, database, organizational chart and the like. The content of "artifacts" is more specifically described below in the section entitled "Exemplary Artifacts." However, for the purposes of the instant discussion, an artifact is a type of information relating to a blueprint for a business solution. Typically, several artifacts will be cross-referenced so the interrelationships between business processes may be accounted for.

In one embodiment a blueprint is preconfigured for a particular industry model. For example, one or more blueprints may exist for different industries, such as: transportation, banking, insurance, manufacturing and the like. In each case, the artifacts within the blueprint may be preconfigured with descriptions of processes that are typical to the industry. Thus, completing the artifacts and blueprints for a particular enterprise may simply involve adding unique identification and reference information and descriptions for any unique company processes. As may be appreciated, having preconfigured artifacts and blueprints may reduce the time and expense of generating a business software solution for an enterprise. Once the artifacts within a blueprint are completed, and therefore describe the business processes within the company, a software designer or programmer may use the blueprint as a reference to generate a business software solution as described below in connection with block 230 as well as in FIG. 3.

Method 200 begins at block 210, where one or more blueprints that are configured according to an industry model of the company are selected. For example, if the company is an airline, a blueprint that is preconfigured for the airline industry may be used. As may be appreciated, many of the business processes of an enterprise within a particular industry will likely be similar to the business processes of other companies within the industry. Thus, by selecting an appropriate blueprint a time savings in generating a business software solution maybe obtained. In addition, a blueprint may be used in whole or in part, and several blueprints may be employed. For example, an enterprise that has business operations that span two or more industries may require the use of a blueprint from each industry. Alternatively, if an enterprise is primarily engaged in one industry (e.g., providing air transportation), with only a relatively few business processes that are in a second industry (e.g., providing food service at airport concessions), a blueprint from the primary industry (e.g., air transportation) may be employed in conjunction with one or more artifacts from the second industry (e.g., food service). As may be appreciated, any combination of artifacts and blueprints is equally consistent with an embodiment of the present invention.

After one or more blueprints have been selected, then the blueprints are customized according to the specific requirements of the company (block 220). As may be appreciated, the company may employ one or more business processes that are unique in the industry, and therefore the blueprint that was selected in block 210 may not completely describe all of the relevant business processes of the company. Thus, artifacts may need to be modified, and even created if necessary. In addition, any cross-references between artifacts may need to be changed if the interrelationships between processes require it. Accordingly, at the completion of block 220 a blueprint that describes the relevant business processes of the company, the interrelationships between such processes and the like, is generated.

At block 230, a computer programmer or the like may create, select or modify functional components. A functional component is any type of software component that may be used to implement and/or automate a business process. For example, a functional component may be a pre-fabricated software module or the like. A functional component may be used without any modification if the component is capable of automating a business process without any such modifications. In most embodiments, at least some modification of a component may be necessary to both automate a business process and maintain the necessary interrelationships between processes as determined above in connection with block 220. If necessary, one or more functional components may need to be created to automate a business process. Block 230 is discussed in greater detail in connection with FIG. 3, below.

At block 240 the functional components of block 230 and any additional programming are incorporated into a business software solution for the company. As may be appreciated, the result of block 240 may be a single software application that automates all of the relevant business processes. Alternatively, several independent software applications may be generated to automate an enterprise's business processes. The present invention includes either of these scenarios. In one embodiment where several software applications are employed, one or more of the applications are in operative communications with each other so as to maintain any operative interrelationships between the applications. In other embodiments, the software applications operate independently of each other. It should be noted that the application program(s) may not implement every business process specified in the blueprint, but may be limited to those processes that are capable of being implemented in software, or for which it is economically feasible or desirable to employ a software-based solution.

After the business software solution has been developed, the solution is implemented or deployed in a hardware infrastructure of the enterprise. As may be appreciated, the hardware selected to implement the solution is typically hardware that is a suitable platform for the solution within any possible budgetary constraints. If the solution is, for example, a computer program requiring input from an employee who is located at a fixed location, the solution may be implemented by a conventional personal computer or the like. Likewise, if the solution requires input from an employee who will be mobile, then the solution may be implemented using a laptop or handheld computer, or the like. Alternatively, the solution may be implemented using specialized equipment such as, for example, telephone switching equipment, air traffic control equipment, financial databases and the like. As may be appreciated, the above-mentioned hardware may be combined in any manner, and the present invention contemplates any such combination.

Figure 3:
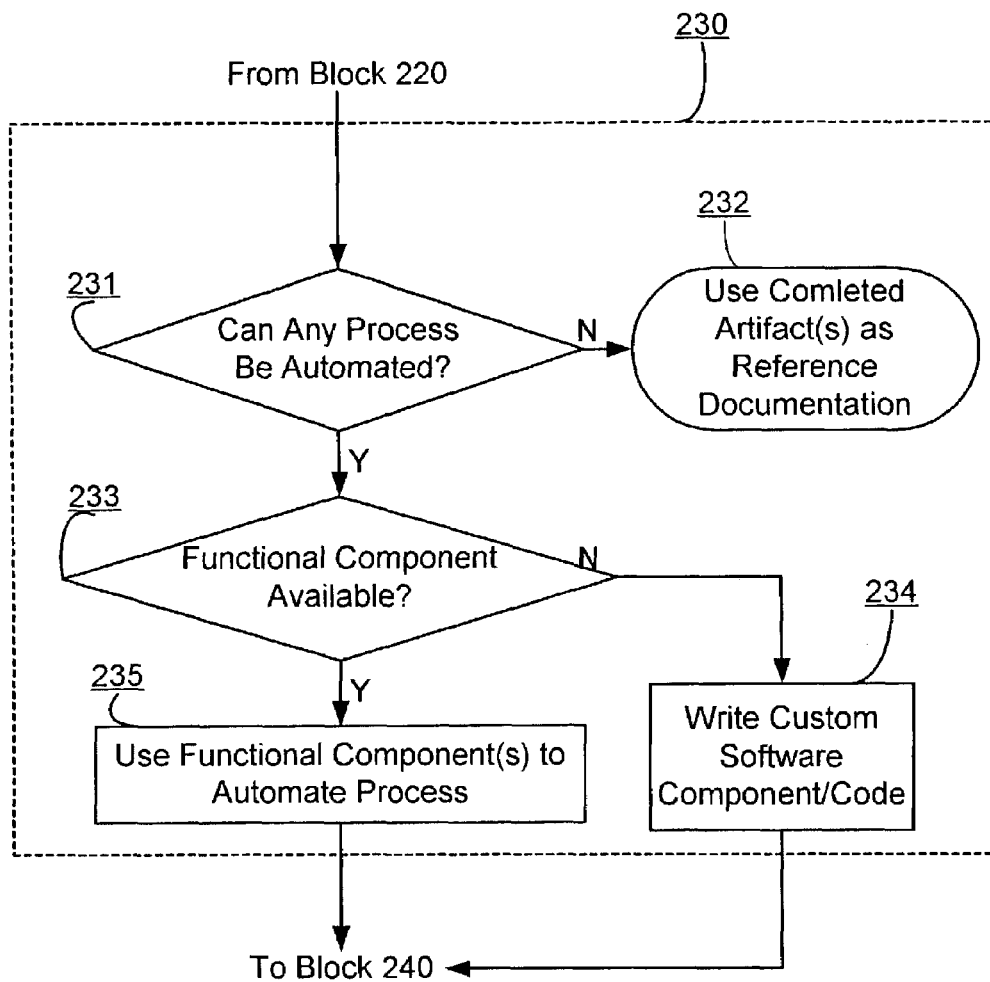
FIG. 3 is a flowchart illustrating a detail of block 230 from FIG. 2 according to an embodiment of the present invention.

Referring now to FIG. 3, a detail of block 230 from FIG. 2 is shown. In essence, FIG. 3 shows how blueprints (including any customized blueprints that were developed in accordance with block 220) may be used to select or design functional components for a business solution. As may be seen in FIG. 3, the detail of block 230 comprises blocks 231-235. Block 231 is entered from block 220 of FIG. 2. Within block 231, a determination is made whether the business process documented in an artifact is to be automated. As noted above, some processes are not capable of being automated by software, and still other processes may not be automated for various reasons (e.g., cost) even though such processes are amenable to automation. If, for whatever reason, a process is not to be part of the software solution under development, the completed artifact may nevertheless be retained as a reference (block 232). For example, the completed artifact may comprise a word processing document or slide-show presentation that can be used to train new personnel, to assist a programmer in programming related business processes and the like, or develop a software solution in the future as may be permitted by new technology (or changed economic circumstances).

If, however, the business process is to be automated, then at block 233 a determination is made as to whether a functional component is available. As noted above in connection with FIG. 2, a functional component may be a prefabricated software module or the like. If such a component is available, then such component is used to automate the business process (block 235). As may be appreciated, more than one component may be used to automate a business process. In such a situation, the components may be preconfigured to operate together, or may require custom software to operate together to automate the business process. Any such configuration is equally consistent with an embodiment of the present invention. If no components are available, then at block 234 a custom component is written. As may be appreciated, the custom component may implement all of the functionality necessary to automate the business process, or only a part of such functionality. In the latter case, the component may be a part of a larger component or software program. Ultimately, after either of blocks 234 or 235, the process exits block 230 and continues to block 240 of FIG. 2.

Figure 4:
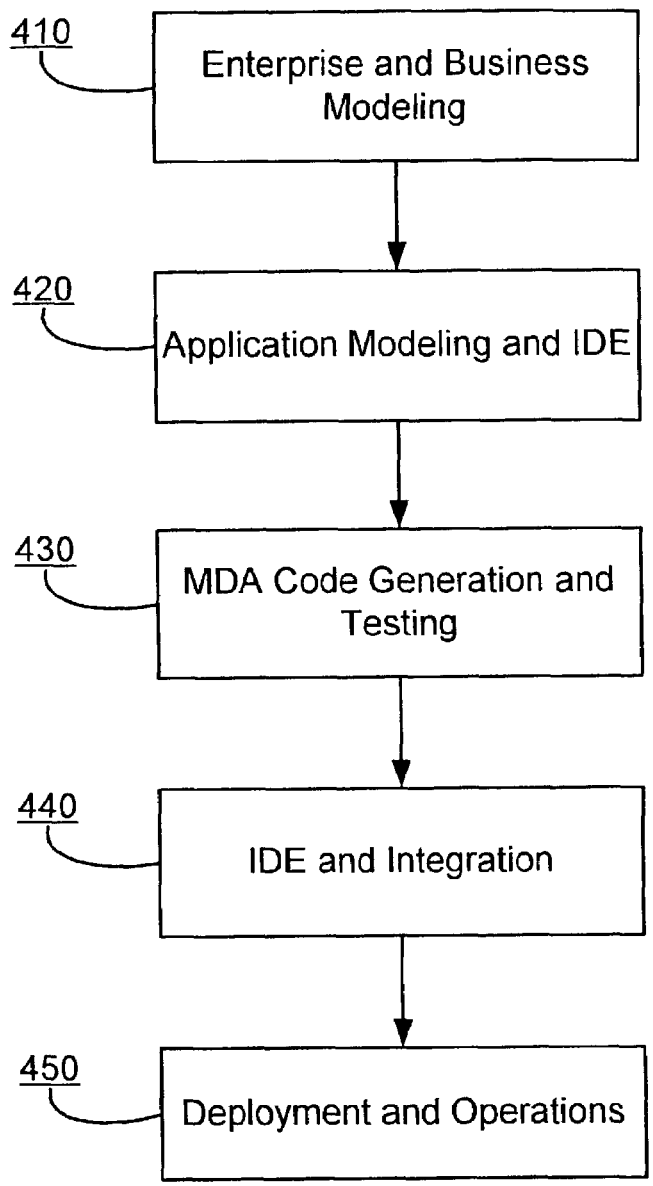
FIG. 4 is a block diagram illustrating the types of conventional software applications that may be utilized at different stages of automating business processes according to an embodiment of the present invention.

The use of a blueprint according to an embodiment supports end-to-end traceability, Return On Investment (ROI) analysis and Model Driven Architecture (MDA) capabilities. These goals may be achieved through the use of various software development tools. Referring now to FIG. 4, a block diagram is provided that illustrates the types of conventional software development tools that may be utilized at different stages of automating a business process according to an embodiment. As may be appreciated, the following is intended solely as an illustrative list of suitable applications, and any type of business software application is equally consistent with an embodiment of the present invention. At block 410, enterprise and business modeling takes place to document the business processes of an enterprise as was described above in connection with blocks 210 and 220 in FIG. 2. For this step, business modeling software such as, for example, the PROVISION tool from the Proforma Corporation may be used to generate electronic documents that embody the business processes of the company. At block 420, application modeling and the use of an Integration Development Environment (IDE), such as Logic and Information Network Compiler (LINC) and Unified Modeling Language (UML), takes place in order to design functional software components and/or to create custom software code as was discussed above in connection with block 230 of FIG. 2. As was also discussed above, RATIONAL ROSE enables a programmer to perform such application modeling. In addition, ENDEAVOR software from Unisys Corporation, or the like, may be employed to perform such modeling. Business modeling tools and software modeling tools such as those mentioned above are generally known in the art and thus are not described herein.

At block 430 MDA code generation and testing takes place to incorporate and test the functional components and/or custom software code that was created as discussed above in connection with block 240 of FIG. 2. As may be appreciated, in a real-world implementation of the business software solution of block 240 testing may be performed prior to implementing the solution to perform the company's business processes. Such generation and testing may use software such as, for example, ARCSTYLER from Interactive Objects Software GmbH. ARCSTYLER is an architectural IDE for MDA, and enables model-centric design of business infrastructures. Also suitable for block 430 is ENDEAVOR from the Unisys Corporation or the like.

At block 440 IDE and integration takes place using, for example, the JUPITER e-business solution from Microsoft Corporation. JUPITER is actually a suite of business-specific software applications that enable a programmer, project manager or the like to integrate the components of the business software solution for an enterprise. The WEBSPHERE e-business platform from IBM Corporation and the WEBLOGIC platform from BEA Systems, Inc. may also be used for block 440. Both WEBSPHERE and WEBLOGIC are business software platforms. Finally, at block 450 the business software solution is deployed to the hardware infrastructure and operated using, for example, JUPITER, WEBSPHERE, WEBLOGIC or SENTINEL SERVER from Unisys Corporation.

Ultimately, the processes described above in connection with FIGS. 1-4 will most likely be implemented in connection with an enterprise that requests a business software solution for the business processes that occur within the company. For example, an enterprise may wish to enhance or replace the business software it already uses, or may even wish to create an entirely new business software solution. Regardless of the reason for creating the business software solution, changes may need to be made to the business processes that occur within the company. Changing market conditions, law changes, improvements to process efficiency and the like may all necessitate changes to an enterprise's business processes. Accordingly, an embodiment of the present invention provides a solution that will be documented well enough to permit the propagation of changes that may be made to one part of the business software solution to other, related parts of the solution.

For example, an enterprise may change a parameter of a particular business process that is automated by a business software solution. Thus, the software is modified to effectuate the change. However, the change may affect other processes within company, whether automated or not. The completed artifacts that were used to create the now-changed business software solution provide the tools for a programmer to determine where additional changes, if any, may need to be made to the rest of the business software solution or artifacts. Accordingly, a programmer will have an efficient way to determine whether a change made to one part of the solution will affect another part of the solution and, if so, where additional changes need to be made. In order to ensure that any software developed can be modified and understood in the future, it is desirable to introduce a level of "traceability" to the software development process. "Traceability," in this context, means that any design decisions that are made—including any departures from the original blueprint on which a solution is based—are documented, so that the design decisions, and the effects that they may have on the other parts of the solution, will be known to those who must use or modify the solution in the future. Preferably, this documentation is made at the time that any design decisions—or any actual design of components—is performed, since that is the time at which the understanding of the design, and the implication of any design decisions, will be at its highest.

Figure 5:
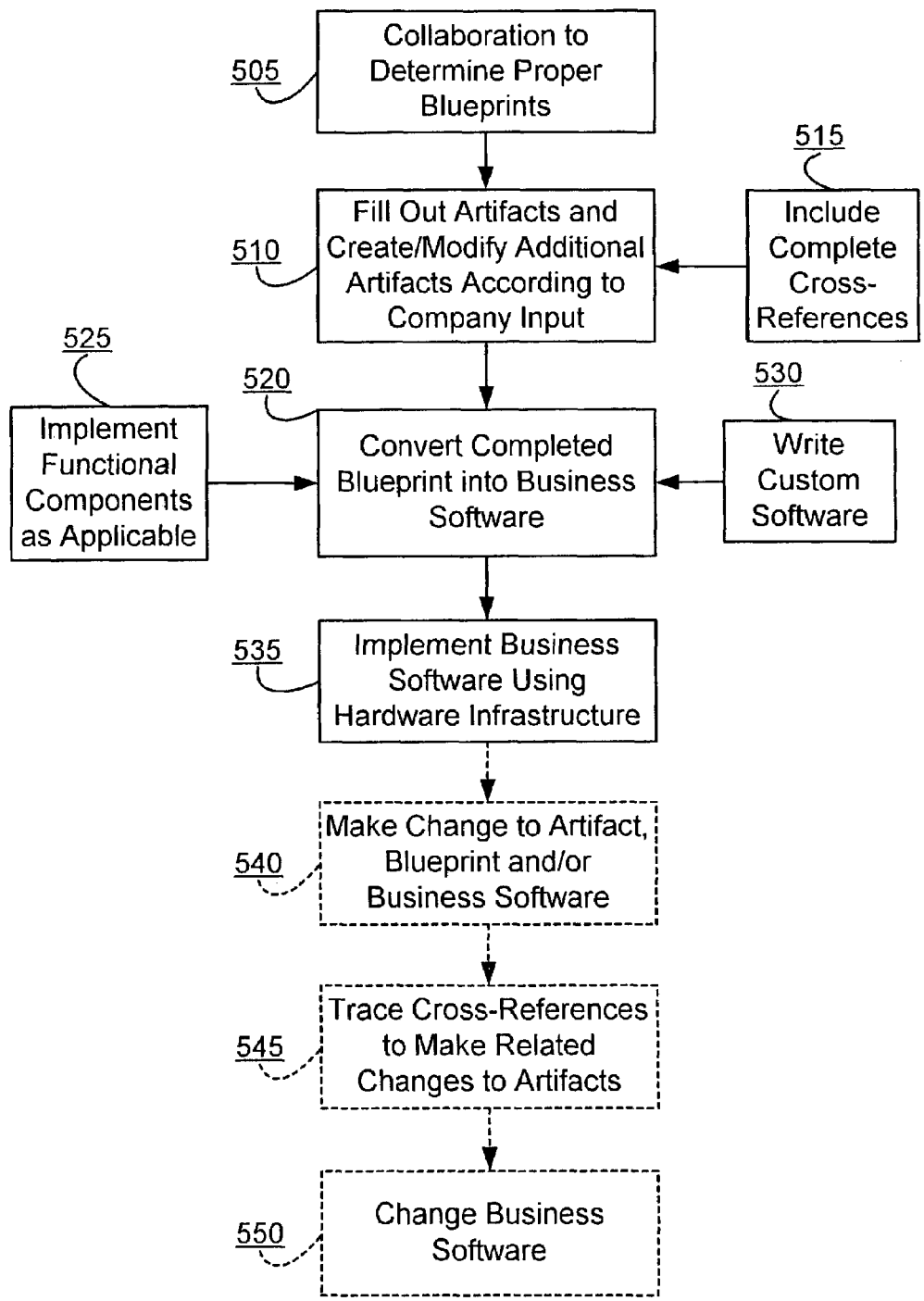
FIG. 5 is a block diagram illustrating an exemplary method of taking the business processes of a company and automating such processes in a robust business software solution that enables the propagation of changes throughout the solution according to an embodiment of the present invention.

Accordingly, and turning now to FIG. 5, a block diagram illustrates a exemplary method of taking the business processes of an enterprise and automating such processes in a robust business software solution that enables the propagation of changes throughout the solution. At block 505, the company collaborates with a software designer to determine the proper blueprint or blueprints to use. As was discussed above in connection with FIGS. 2 and 3, such a collaboration may include using a single blueprint in its entirety, or several blueprints. Such a collaboration may also include taking custom-selected artifacts from one or more blueprints and combining such artifacts into a custom blueprint. As was noted above, any type of collaboration resulting in any combination of artifacts and blueprints is equally consistent with an embodiment of the present invention. At block 510, the artifacts are filled out according to the business processes used by the company. As was also noted above in connection with FIGS. 2 and 3, an artifact may be pre-configured according to an industry model. Therefore, an artifact may or may not be modified at block 510, depending on whether the company process adheres to the industry model. During block 510, each process that is documented in an artifact is cross-referenced as applicable to other processes. For example, a process for accepting airline reservations by way of the Internet may be cross-referenced to a process for updating the number of meals to be ordered for a flight based on the number of passenger reservations.

Upon completing the documentation of the business processes of the company, at block 520 the completed blueprint is converted into a business software solution. As was discussed above in connection with FIG. 3 above, the processes are implemented using existing functional components when possible, as indicated by block 525. When using such functional components is not possible or desired, at block 530 custom software code is written to implement such business processes. As may be appreciated, any combination of functional components and custom-written software code is equally consistent with an embodiment of the present invention. As described above in connection with FIG. 4, various business modeling and software modeling and software modeling tools may be used to aid in the software development process.

At block 535, the business software solution that was created in block 520 is implemented or deployed in an appropriate hardware infrastructure. As was noted above in connection with FIG. 2, such hardware infrastructure may be any type of computing device that is capable of executing the business software that is assigned to it. As may be appreciated, many different hardware components may be necessary to implement the entire business software solution.

Thus, after block 535, a completed and implemented business software solution is provided. Optional blocks 540, 545 and 550 serve to illustrate a process of making a change to a business process that then propagates throughout the business software solution. At optional block 540, therefore, a business process is changed. Such a change may be made to the artifact that documents the business process, or directly to the functional component or software code that automates the business process. At optional block 545, a programmer or the like follows the cross-references in the artifact that documents the changed process to determine the artifacts and/or blueprints that are affected by the change and to change such artifacts and/or blueprints accordingly. As was discussed above in connection with FIG. 2, the cross-references may simply be text references, or may be something more complex such as an electronic link or the like. At optional block 550, the functional component or software code associated with the artifacts and/or blueprints changed in block 545 is changed according to the change made in block 545. Thus, the automated business process undergoes a complete change, whereby the original change is propagated throughout the business software solution. In doing so, an embodiment of the present invention ensures that a change made to one business process is accounted for in all other business processes within an enterprise.

As may be appreciated, the changes discussed above in connection with blocks 540-550 may be made without being implemented in the company's operations. For example, an enterprise may plan to determine the total effect and cost of a particular change to a business process. Thus, a copy or the like of the business process' artifact may be made, and the change made according to the plan. Accordingly, the cross-references in the artifact are followed to determine whether any other processes are affected by the change. Upon finding any such processes, the associated artifacts are inspected to determine any additional processes that may be affected, and so on. Ultimately, the company will know the extent to which the desired change will affect the company's business processes, and will be able to accurately estimate the costs involved with making such a change. The company may then decide to implement the change, or may decide to cancel the change, based at least in part on the extent to which the change will affect the company's business processes.

Figure 6:
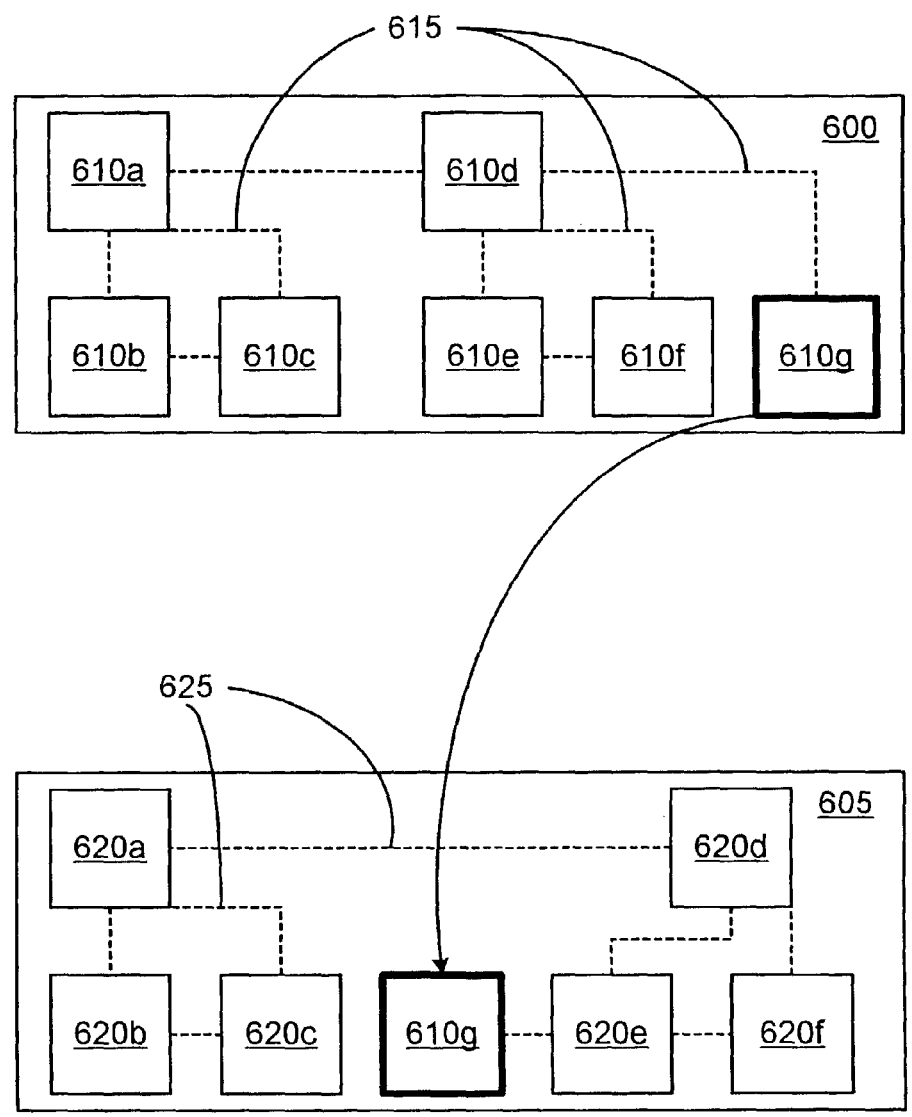
FIG. 6 is a block diagram illustrating interchangeability of artifacts within two blueprints.

As noted above in connection with FIGS. 2, 3 and 5, the artifacts within a blueprint may be interchanged to more accurately represent a business process of an enterprise. By interchanging and/or modifying existing artifacts, rather than creating new artifacts, a time and cost savings may be attained because of the reduced workload necessary to document the business process. Accordingly, in FIG. 6, a block diagram of two blueprints 600 and 605 is illustrated. Within blueprint 600 are artifacts 610a-g, which are interrelated by way of cross-references 615. Likewise, blueprint 605 contains artifacts 620a-f—as well as artifact 610g as will be discussed below—which are interrelated according to cross-references 625. As may be appreciated, the configuration of blueprints 600 and 605, as well as artifacts 610a-g, 620a-f and cross-references 615 and 625, are merely for illustrative purposes, as any configuration is equally consistent with an embodiment of the present invention.

As can be seen in blueprint 600, for example, artifact 610c is related to both artifact 610a and artifact 610a. Artifact 610c is also related to artifacts 610e-g, but only by way of artifacts 610a and 610d. Blueprint 605 exhibits similar interrelationships between artifacts 620. As noted above, it is sometimes advantageous to interchange artifacts from different blueprints to describe an enterprise's business processes. Such interchanging is sometimes advantageous because a similar business process may occur in different companies, or even in different industries. For example, receiving a customer payment by way of the Internet will most likely be a similar process regardless of whether the company is an airline or a bookstore. Likewise, a financial services company may employ a process of originating a loan that is similar to an insurance company's process of initiating an insurance application. As a result, an artifact, such as artifact 610g, may be taken from a blueprint, such as blueprint 600, and copied to a different blueprint 605. As can be seen in blueprint 605, artifact 610g has been copied and cross-referenced to artifact 620e to indicate an interrelationship between the business processes described by artifacts 610g and 620e. Thus, an enterprise whose business processes are being described by blueprint 605 is spared the expense of generating artifact 610g "from scratch." Artifact 610g may be suitable in its unedited state, or may require modifications. Accordingly, a company, programmer, or the like should only generate a new artifact when the modifications to an existing artifact would be more costly in terms of time or expense.

It should be appreciated that the process of selecting and customization a blueprint may be performed with the aid of a software-based tool. For example, a software tool may present a software designer with a choice of blueprints, and may allow the designer to customize, change, or replace artifacts in the blueprint. Moreover, the tool may perform the act of propagating any changes in one artifact to any related artifacts.

Example Artifacts

As noted above in connection with FIG. 2, a company blueprint is comprised of cross-referenced artifacts. In addition, the artifacts may be preconfigured to describe processes that are typical for a given industry model. The following describes the types of artifacts that may be associated with a blueprint. As may be appreciated, this set of artifacts is for illustrative purposes only, as an embodiment of the present invention may include any type of artifacts.

The various artifacts may be broken down based on the various layers of an enterprise to which a given blueprint applies. These layers include:

Business Vision and Operations Model. This is a layer that businesses are just "getting a grip" on and include. For example, in the case of a financial services enterprise, the information contained in artifacts may include Exchange Pattern, Portal Pattern, Brokerage Pattern, Franchise Pattern.

Business Process Model and Patterns. Higher-level abstractions that comprise the previous layer functions. For example, in a financial services enterprise the information contained in artifacts may include information about the functions of accounting, teller window, call center, etc.

Functional/Application Model. Key Business functions implemented as a set architectural models (UML) representing core business services.

Infrastructure Model. Key Functional Services (Web Services) that are provided to all applications in the organization (Security, Network, Application Server, Data Services, Integration Services, Administration).

For the Business Vision and Operations Model layer, artifacts may include:
Industry description, including:
Parties external to the industry
Parties internal to the industry
Industry trends
Business environment
Enterprise overview, including:
Business vision and strategy
Information needs and business data structures
Organizational structure
Business locations
Business events and results For the Business Process Model and Patterns layer, artifacts may include:
Business Area, including:
Business functions and processes
Information needs and business data structures
Organizational structure
Business locations
Business operations
Business operations, including:
Business workflows and simulations
Business events and results
Business rules
Business class diagrams For the Business Process Model and Patterns layer, artifacts may include:
Business Requirements, including:
Business vision
Business glossary
Business use-case model
Business use-case spec
Information generated by or used by systems analysts, including:
Vision
Glossary
Supplementary spec
Use-case model
Use-case storyboard
Use-case specification
User interface prototype
Software requirements spec
Information generated or used by systems architects, including:
Analysis model
Design model
Data model
Software architecture document
Implementation model Information generated or used by a systems test team, including:
Test plan
Information generated or used by a systems integration manager, including:
Integration build plan
For the Business Process Model and Patterns layer, artifacts may include:
Information generated or used by a deployment architect, including:
Deployment model
Information generated or used by a deployment manager, including:
Deployment plan
Release notes
Bill of materials
Information generated or used by an implementer, including:
Installation artifacts
Information generated or used by a technical writer, including:
End-user support material
Information generated or used by a course developer, including:
Training materials The following is an exemplary set of categories of artifacts, broken down by the various phases of the software development process to which the artifacts may relate:

0—Introduction
Executive summary and application overview
1—Business Modeling
Swim Lane Process Workflow
E-R Diagrams
CRUD Matrix
Process Simulation
Business Vision
Business Glossary
Business Use-Case Model
Business Use-Case Specification
Business Object Model
2—Requirements
System Vision Document
System Glossary
Supplementary Req Specification
Use-Case Model & Specifications
Use-Case Story Board
User Interface Prototype
Software Requirements Specification
3—Analysis And Design
Analysis Model
Analysis Class Hierarchies
System Domain Model
Sequence Diagrams
Use Case Realizations
Design Model
Sequence Diagrams
Component Models
Data Model
Deployment Model
Software Architecture Document
4—Implementation
Integration Build Plan
Implementation Model
5—Test
Test Plan
6—Deployment
Deployment Plan
Bill of Materials
Release Notes
Installation Artifacts
End User Support Materials
Training Materials Thus, a system and method for generating a business software solution has been provided. While the present invention has been described in connection with the exemplary embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any configuration of components in any type of business application environment. Therefore, the present invention should not be limited to any single embodiment, but rather should be construed in breadth and scope in accordance with the appended claims.

What is claimed:

1. A computer implemented method executing software with a computer system for providing a software-based solution for an enterprise comprising:
    selecting a blueprint from a plurality of blueprints, each of said plurality of blueprints comprising a set of artifacts that relates to a particular industry and provides a cross-referenced representation of business processes that occur within the enterprise, said blueprint being selected based on a first industry in which the enterprise operates;
    selecting or creating functional software components based on said blueprint; wherein said functional software components automate at least one process of the enterprise;
    creating the software-based solution based on the functional software components;
    deploying the software-based solution in an infrastructure of the enterprise; and
    creating documentation for a process of the enterprise that is not automated by software and storing said documentation in one of said set of artifacts.

2. The method of claim 1, wherein said functional software components comprise software modules.

3. The method of claim 1, wherein said software-based solution comprises an application program or a collection of application programs.

4. The method of claim 1, wherein said blueprint comprises a description of a plurality of processes relating to said first industry, and wherein said software solution implements a proper subset of said plurality of processes.

5. The method of claim 1, further comprising:
    customizing said blueprint based on requirements of said enterprise.

6. The method of claim 1, further comprising:
    creating documents describing the reasons for, or goals of, at least one of:
        the selection of a particular functional software component based on the blueprint;
        a decision made in the creation or selection of said software-based solution based on said functional software components; and
        a decision made with respect to the act of deploying said software-based solution.

7. A computer implemented method executing software with a computer system for facilitating the design of a software-based solution comprising:
    receiving a selection of a blueprint from a plurality of blueprints, each of said plurality of blueprints comprising a set of artifacts that relates to a particular industry and provides a cross-referenced representation of business processes that occur within the enterprise, said blueprint being selected based on a first industry in which an enterprise operates;

receiving first information relating to a reason for, or goal of, the creation or selection of one or more functional software components based on said blueprint; wherein said functional software components automate at least one process of the enterprise;

receiving second information relating to a reason for, or goal of, a decision made in the creation of the software-based solution based on the functional software components;

providing documentation of the software-based solution based on at least one of said first information and said second information; and receiving third information relating to a process of the enterprise that is not automated by software and storing said documentation in one of said set of artifacts.

8. The method of claim 7, wherein said functional software components comprise one or more software modules.

9. The method of claim 7, wherein said software-based solution comprises an application program or a collection of application programs.

10. The method of claim 7, wherein said blueprint comprises a description of a plurality of processes that relate to said first industry, and wherein said software-based solution implements a proper subset of said plurality of processes.

11. The method of claim 7, further comprising:
receiving third information relating to one or more customizations of said blueprint based on requirements of said enterprise, wherein said documentation is further based on said third information.

12. A computer-readable storage medium encoded with computer-executable instructions to perform acts comprising:

providing a plurality of blueprints, each of said plurality of blueprints comprising a set of artifacts that relates to a particular industry and provides a cross-referenced representation of business processes that occur within the enterprise;

receiving a selection of one of said blueprints, said blueprint being selected based on a first industry in which an enterprise operates;

recording first information related to a selection of one or more functional software components based on said blueprint; wherein said functional software components automate at least one process of the enterprise, and said second information being based on user input and said set of artifacts; and recording second information relating to the deployment of said application program or collection of application programs in an infrastructure of said enterprise; and creating documentation, said documentation being based on said second information and user input regarding a process of the enterprise that is not automated by software, and storing said documentation in one of said set of artifacts.

13. The computer-readable storage medium of claim 12, wherein said acts further comprise:
recording third information that relates to a design of an application program or collection of application programs based on said functional software components, said third information being based on said second information and user input.

14. The computer-readable storage medium of claim 13, wherein said one of said blueprints comprises a description of a plurality of processes relating to said particular industry, and wherein said application program or collection of application programs implements a proper subset of said plurality of processes.

15. The computer-readable storage medium of claim 12, wherein said functional software components comprise one or more software modules.

16. The computer-readable storage medium of claim 12, wherein said acts further comprise:
recording third information related to one or more customizations of said one of said blueprints, said customizations being based on a requirement of said enterprise, said third information being based on user input and said first information.

* * * * *